United States Patent [19]

Chen et al.

[11] Patent Number: 5,713,041
[45] Date of Patent: Jan. 27, 1998

[54] COMPUTER SYSTEM HAVING A HOST CPU AND A LOGIC FOR INTEGRATING PERIPHERAL CONTROL FUNCTIONS INTO THE HOST CPU

[75] Inventors: Chengwu Chen, Rancho Cordova; Michael A. Gley, Sacramento, both of Calif.

[73] Assignee: Intel Corporation, Santa Clara, Calif.

[21] Appl. No.: 675,421

[22] Filed: Jul. 8, 1996

Related U.S. Application Data

[63] Continuation of Ser. No. 260,109, Jun. 15, 1994, abandoned.

[51] Int. Cl.$^6$ ................................................ G06F 15/00
[52] U.S. Cl. ................... 395/800; 395/500; 395/733; 395/868; 395/825; 395/821
[58] Field of Search .................. 395/825, 868, 395/800, 821, 500, 733

[56] References Cited

U.S. PATENT DOCUMENTS

| | | | |
|---|---|---|---|
| 3,710,324 | 1/1973 | Cohen et al. | 395/860 |
| 4,000,485 | 12/1976 | Barlow et al. | 395/726 |
| 4,261,034 | 4/1981 | Saccomano et al. | 395/869 |
| 4,519,034 | 5/1985 | Smith et al. | 395/881 |
| 4,930,068 | 5/1990 | Katayose et al. | 395/734 |
| 5,237,692 | 8/1993 | Raasch et al. | 395/740 |
| 5,280,618 | 1/1994 | Takagi | 395/733 |
| 5,377,347 | 12/1994 | Hiiragizawa et al. | 395/557 |
| 5,410,715 | 4/1995 | Ishimoto et al. | 395/737 |
| 5,526,503 | 6/1996 | Kim | 395/413 |

Primary Examiner—Alyssa H. Bowler
Assistant Examiner—John Follansbee
Attorney, Agent, or Firm—Blakely, Sokoloff, Taylor & Zafman

[57] ABSTRACT

A computer system is described. The computer system includes a bus, a CPU coupled to the bus, and a memory coupled to the bus. A peripheral device is coupled to the bus for performing a predefined peripheral operation. A logic is coupled to the bus and the peripheral device for causing the CPU to be interrupted to control the peripheral device for the peripheral operation when the logic receives a request for the peripheral operation. The logic does not control the peripheral device to perform the peripheral operation. The peripheral operation of the peripheral device is only controlled by the CPU. The request may be generated by a software program running on the CPU. The request may also be generated by the peripheral device. Although the CPU is controlling the peripheral operation, the existing peripheral controller-based application software can still be used. A method for controlling the peripheral device for the peripheral operation is also described.

12 Claims, 5 Drawing Sheets

COMPUTER SYSTEM HAVING A HOST CPU AND A LOGIC FOR INTEGRATING PERIPHERAL CONTROL FUNCTIONS INTO THE HOST CPU

This is a continuation of application Ser. No. 08/260,109, filed Jun. 15, 1994, now abandoned.

FIELD OF THE INVENTION

The present invention pertains to the field of computer systems. More particularly, this invention relates to a computer system with a central processing unit ("CPU") and a peripheral device, wherein the peripheral control function of the peripheral device is integrated into the CPU such that the computer system operates without peripheral controller to control the peripheral device and yet is compatible with the peripheral controller-based software.

BACKGROUND OF THE INVENTION

Historically, a prior art personal computer system typically includes a CPU, a memory coupled to the CPU, and a peripheral interface connected to the CPU. Peripheral devices of the computer system are connected to the peripheral interface. The CPU controls the peripheral devices to perform peripheral operations via the peripheral interface. When a peripheral device is required to perform a peripheral operation, the peripheral interface generates an interrupt request to the CPU. The CPU then interrupts its current execution and controls the peripheral device to perform the peripheral operation. Software programs are developed in accordance with this type of architecture.

Problems are, however, associated with this type of prior art computer system. One problem is that as the number of peripheral devices controlled by the CPU increases, the CPU's processing time to control the peripheral operations also increases. This typically decreases the processing time available for the CPU to execute application programs. This adversely affects the overall processing speed of the computer system. It is especially so when additional functions such as data compression and decompression, data error detection and correction, and data encoding and decoding are added to the peripheral devices. Typically, each of the data compression and decompression, data error detection and correction, and data encoding and decoding functions takes a considerable amount of processing time to complete.

A prior art solution to this problem is to provide a dedicated microcontroller for each of the peripheral devices. The dedicated microcontroller assumes all the control functions of the peripheral device from the CPU and controls the peripheral device to perform a peripheral operation when requested. The CPU typically generates the request for the peripheral operation to the microcontroller and receives the resulting data with respect to the peripheral operation from the microcontroller. The CPU, however, does not directly control the peripheral operation of the peripheral device.

Disadvantages are, however, still associated with this prior art solution. One disadvantage is that because each of the peripheral devices includes a dedicated microcontroller to control the operation of the device, the manufacturing cost of the computer system tends to rise significantly. This typically is the case when the computer system has a large number of peripheral devices.

Another disadvantage is that some of the microcontrollers for the peripheral devices are typically not functioning at most times. This typically causes the resources of the microcontrollers in the system to be wasted. In addition, the advances in microprocessor technologies have also led to the creation of high speed and high performance microprocessors. When such a microprocessor is used as the CPU in a system, the high speed and high performance CPU typically completes its execution before a required peripheral operation is completed. This typically causes the CPU to wait for the resulting data from the microcontroller, causing the CPU resources to be wasted.

SUMMARY AND OBJECTS OF THE INVENTION

One of the objects of the present invention is to integrate functions of peripheral controllers for peripheral devices into a host CPU of a computer system.

Another object of the present invention is to provide a computer system that is manufactured cost effectively.

Another object of the present invention is to provide a computer system that does not include a peripheral controller for controlling operations of a peripheral device.

Another object of the present invention is to provide a computer system that does not include a peripheral controller for controlling operations of a peripheral device and yet is still compatible with peripheral controller-oriented system software.

Another object of the present invention is to provide a computer system with the ability to redirect requests for a peripheral controller of a peripheral device to a host CPU such that the computer system can function without the peripheral controller for the peripheral device and yet is still compatible with peripheral controller oriented system software.

A computer system is described. The computer system includes a bus, a CPU coupled to the bus, and a memory coupled to the bus. A peripheral device is coupled to the bus for performing a predefined peripheral operation. A logic is coupled to the bus and the peripheral device for causing the CPU to be interrupted to control the peripheral device for the peripheral operation when the logic receives a request for the peripheral operation. The logic does not control the peripheral device to perform the peripheral operation.

The CPU of the above described computer system executes an application software that generates the request for the peripheral operation if the application software requires the peripheral operation. This request is intended for a peripheral controller of the peripheral device. The computer system does not include the peripheral controller for controlling the peripheral device for the peripheral operation. Instead, the logic causes the CPU to be interrupted to control the peripheral operation of the peripheral device. This allows the existing peripheral controller-based application software to be still operative even though the CPU is controlling the peripheral operation of the peripheral device. The peripheral device of the above described computer system can also generate the request for the peripheral operation.

A method for controlling a peripheral device for a peripheral operation in a computer system is also described. The method includes a step of receiving a request for the peripheral operation in a logic. The logic is coupled to the bus and the peripheral device. The logic does not control the peripheral device to perform the peripheral operation. The CPU is then interrupted by the logic to control the peripheral device for the peripheral operation when the logic receives the request for the peripheral operation. This allows the existing peripheral controller-based application software to be still operative even though the CPU is controlling the peripheral operation of the peripheral device. The request is intended for a peripheral controller of the peripheral device.

Other objects, features, and advantages of the present invention will be apparent from the accompanying drawings and from the detailed description that follows.

BRIEF DESCRIPTION OF THE DRAWINGS

The present invention is illustrated by way of example and not limitation to the figures of the accompanying drawings, in which like references indicate similar elements and in which.

DETAILED DESCRIPTION

Figure 1:
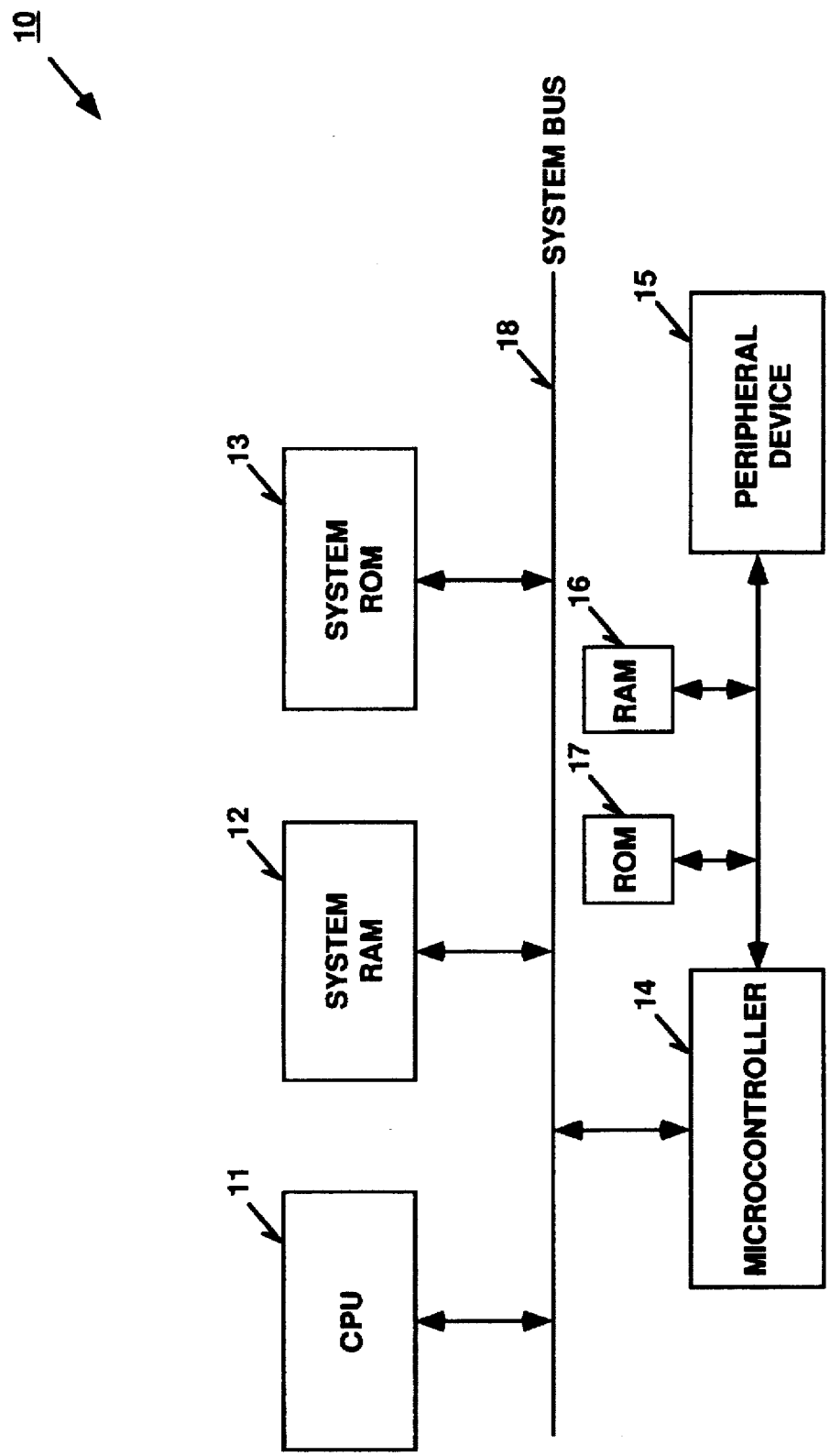
FIG. 1 is a block diagram of a prior art computer system.
Figure 2:
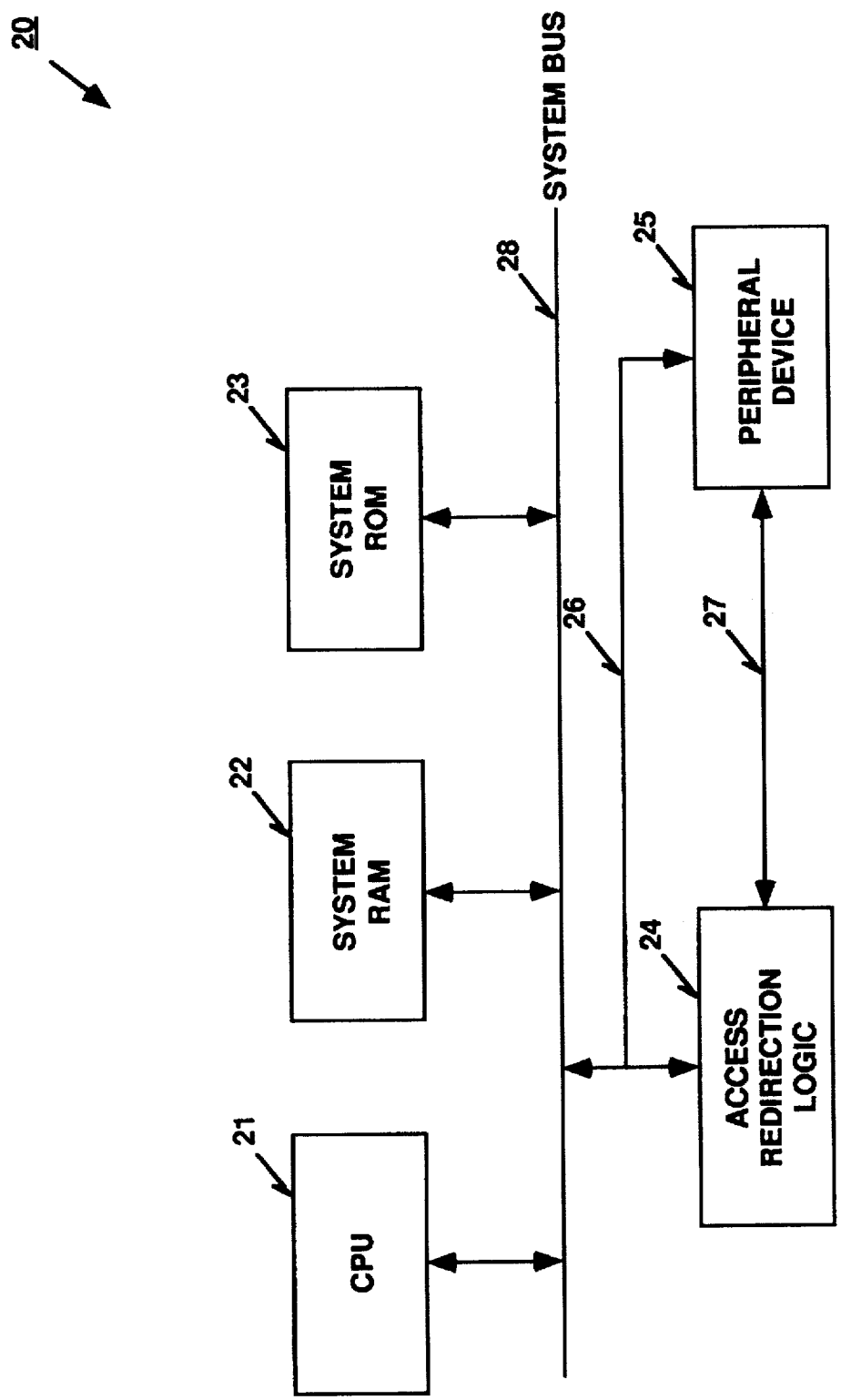
FIG. 2 is a block diagram of a computer system in accordance with an embodiment of the present invention, wherein the computer system includes an access redirection logic for a peripheral device.

FIG. 2 shows a computer system 20 that implements one embodiment of the present invention. Computer system 20 includes a system bus 28 that is connected to a CPU 21, a system RAM 22, a system ROM 23, a peripheral device 25, and an access redirection logic 24. CPU 21 is used to control operation of computer system 20.

For one embodiment, computer system 20 is a personal computer system. For alternative embodiments, computer system 20 can be any other type of computer system. For example, computer system 20 can be a workstation, a mainframe or a mini-computer.

For one embodiment, CPU 21 of computer system 20 includes a microprocessor, a co-processor, a cache, and a cache controller for handling access to the cache by the microprocessor. For a further embodiment, all the above-mentioned components in CPU 21 are integrated into a microprocessor chip manufactured by Intel Corporation of Santa Clara, Calif. Alternatively, CPU 21 may not include all of the above-mentioned components. Furthermore, CPU 21 may include more components than those mentioned above.

System bus 28 is used in computer system 20 as the backplane bus for transfer data among various components of computer system 20. System RAM 22 and system ROM 23 can be accessed by CPU 21 via system bus 28. System RAM 22 and system ROM 23 store data and programs that are needed for the operation of computer system 20.

Peripheral device 25 performs a predefined peripheral operation. Peripheral device 25 can be any kind of peripheral device. For example, peripheral device 25 can be a keyboard, a display, a hard disk drive, a nonvolatile memory card, or a modem.

Computer system 20 may include other memories in addition to system RAM and ROM 22 and 23. These other memories may include an EPROM ("electrically programmable read-only memory") and a flash EPROM ("flash erasable and programmable read-only memory"). Moreover, computer system 20 may include more than one peripheral device.

Access redirection logic 24 is also connected to system bus 28. In addition, access redirection logic 24 is connected to peripheral device 25 via bus 27. Access redirection logic 24 includes control registers, status registers, and data registers (all are not shown). These registers are used to store control information, status information, and data. Peripheral device 25 is also connected to system bus 28 via bus 26. Computer system 20 does not include a dedicated microcontroller to control the operation of peripheral device 25. Moreover, access redirection logic 24 does not control peripheral device 25 for the peripheral operation. Access redirection logic 24 is used in computer system 20 to redirect the request for the peripheral operation of peripheral device 25 to CPU 21 such that CPU 21 can be interrupted to control the operation of peripheral device 25. This allows the peripheral controller-based application software to be still operative on CPU 21 even though peripheral device 25 is controlled by CPU 21, instead of a depicted peripheral controller. The function of access redirection logic 24 will be described in more detail below.

Computer system 20 may also include a number of peripheral devices. When computer system 20 includes a number of peripheral devices in addition to peripheral device 25, computer system 20 may or may not include a dedicated microcontroller for each of the number of peripheral devices. For example, computer system 20 may include dedicated microcontrollers for some of the peripheral devices and does not provide dedicated microcontrollers for the remaining peripheral devices. In this case, each of the peripheral devices that does not have a microcontroller for controlling its operation is connected to an access redirection logic similar to logic 24. As a further example, computer system 20 does not provide a dedicated microcontroller for every one of the peripheral devices. In this case, each of the peripheral devices includes an access redirection logic similar to access redirection logic 24.

Because computer system 20 does not use a dedicated microcontroller to control the peripheral operation of peripheral device 25, the control of peripheral device 25 to perform its peripheral operation is achieved by a set of instruction codes stored in system RAM and ROM 22 and 23. The set of instruction codes may also be stored in other storage devices of computer system 20. The set of instruction codes can also be referred to as peripheral routine or device driver. The peripheral routine or device driver can be executed by CPU 21 of computer system 20. The peripheral routine can be any kind of known peripheral routine for peripheral device 25. Other control or data processing functions for peripheral device 25 may be added by changing the instruction codes of the peripheral routine for peripheral device 25. This can also be done using known means.

The peripheral routine for peripheral device 25 is called and executed every time when peripheral device 25 is required to perform the peripheral operation. Because computer system 20 does not use a microcontroller for controlling peripheral device 25, the peripheral routine for controlling the operation of peripheral device 25 is executed by CPU 21. CPU 21 executes the peripheral routine via an interrupt routine and/or via polling. Therefore, CPU 21 can be either interrupted or polled to execute the peripheral routine when peripheral device 25 is required to perform the peripheral operation and when computer system 20 does not include a dedicated microcontroller for peripheral device 25.

Alternatively, computer system 20 includes a number of peripheral devices, including peripheral device 25, and a peripheral controller to control the operation of all the peripheral devices. The peripheral controller is not a dedicated controller for any of the peripheral devices. Each peripheral device has an access redirection logic similar to logic 24. The access redirection logic for each of the peripheral devices redirects the request for controlling the respective peripheral device to the peripheral controller. The peripheral controller then controls the operation of the respective peripheral device upon receipt of the request. This also allows for backward compatibility with the existing peripheral controller-based application software.

Computer system 20 also includes an operating system (not shown in FIG. 2). The operating system for computer system 20 processes commands, controls program execution, and oversees the hardware and software resources of computer system 20. The operating system of computer system 20 is a peripheral controller-oriented operating system. This means that the operating system regards that each of the peripheral devices in computer system 20 has its dedicated microcontroller for controlling the peripheral operation of the respective peripheral device. This causes the operating system not to interrupt CPU 21 when the peripheral operation of peripheral device 25 is required. Instead, the operating system causes CPU 21 to generate a request for the peripheral operation to peripheral device 25. The request is intended to the dedicated microcontroller of peripheral device 25. This peripheral controller-oriented operating system for computer system 20 requires application programs running on computer system 20 also to be peripheral controller-base application programs.

Because computer system 20 does not include the dedicated microcontroller for controlling peripheral device 25. The request is received in access redirection logic 24 via bus 28. Access redirection logic 24 then redirects the request to CPU 21 such that CPU 21 can be interrupted to execute the peripheral routine of peripheral device 25. Once CPU 21 completes its execution of the peripheral routine, CPU 21 updates logic 24 with the results. Logic 24 then sends the result to the application program running on CPU 21. Logic 24 does this by asserting a task complete interrupt request to CPU 21. By doing so, the peripheral controller-based application program does not perceive any difference and is still operative even though computer system 20 does not have a dedicated peripheral controller to control the operation of peripheral device 25.

Access redirection logic 24 performs its bus access cycle to receive the request. The request that access redirection logic 24 receives from CPU 21 is referred to as application request APPLN_REQ. The application request APPLN_REQ is generated when an application program running on CPU 21 requires the peripheral operation from peripheral device 25. Access redirection logic 24 may also receive a request for controlling peripheral device 25 to perform the peripheral operation from peripheral device 25 via bus 27. This request is referred to as peripheral request PERI_REQ. Peripheral device 25 generates the peripheral request PERI_REQ when peripheral device 25 requires control of its peripheral operation.

When access redirection logic 24 receives the application request APPLN_REQ from CPU 21 or the peripheral request PERI_REQ from peripheral device 25, access redirection logic 24 redirects the request to CPU 21 by generating a CPU interrupt request IRQ to CPU 21. When CPU 21 receives the CPU interrupt request HOST_IRQ, CPU 21 interrupts its normal execution of programs in the conventional manner provided by the operating system. During the interrupt cycle, CPU 21 executes its regular interrupt routine that includes the function of checking the type and source of the interrupt. Because CPU 21 is interrupted by the CPU interrupt request from access redirection logic 24 at this time, the interrupt routine then calls for the peripheral routine. CPU 21 then executes the peripheral routine to control the peripheral operation of peripheral device 25. When CPU 21 finishes execution of the peripheral routine, CPU 21 sends the results to access redirection logic 24 by updating various control, status and data registers of logic 24. CPU 21 then resumes its normal execution until it is once again interrupted. The calling for the peripheral routine by the interrupt routine can be done in the conventional manner.

Once access redirection logic 24 is updated with the results by CPU 21, access redirection logic 24 then notifies the application software running on CPU 21 of the results. Access redirection logic 24 does this by first asserting a task complete interrupt request TASK_COMPL_INT to CPU 21. In this way, the application software does not need to know that CPU 21 controls the peripheral operation of peripheral device 25 and still thinks that the operation of peripheral device 25 is controlled by a dedicated peripheral controller. This allows the application software running on CPU 21 to remain peripheral controller-based application software.

Figure 3:
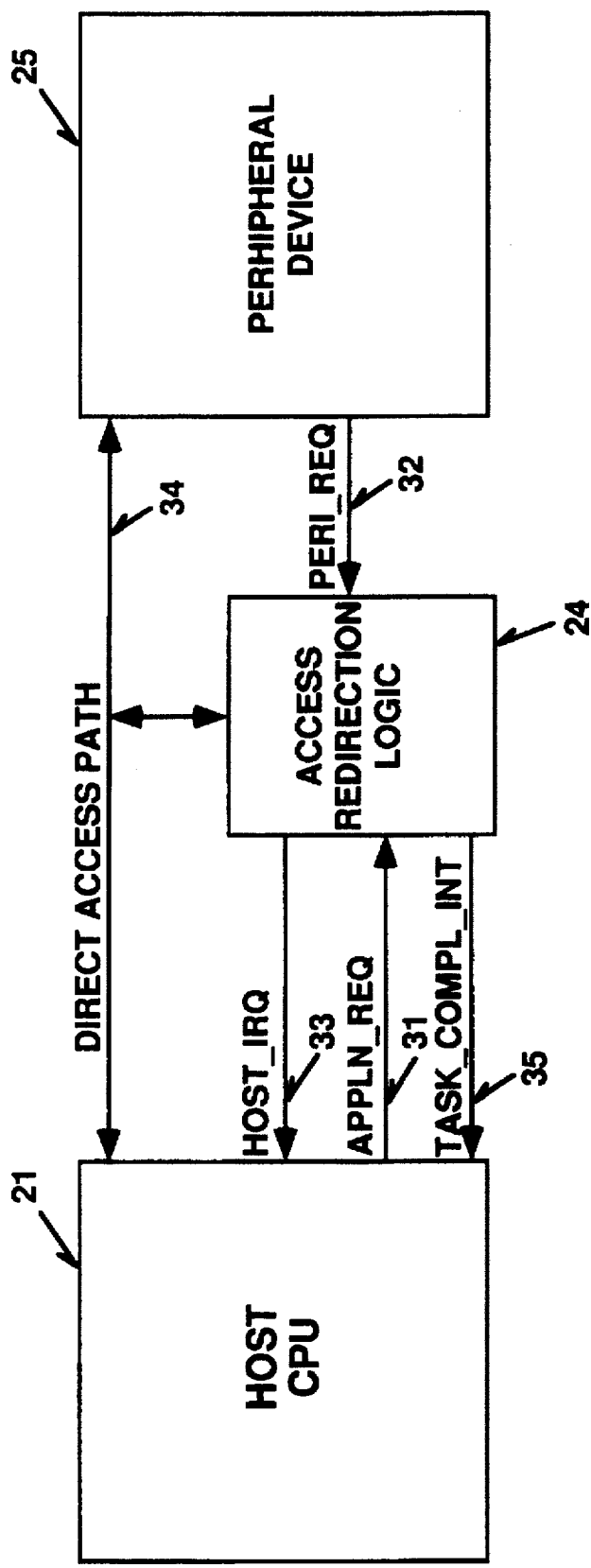
FIG. 3 illustrates the connection of the access redirection logic of FIG. 2 with respect to the peripheral device and the host CPU.

When CPU 21 is interrupted to execute the peripheral routine for controlling the peripheral operation of peripheral device 25, CPU 21 accesses peripheral device 25 directly via buses 26 and 28. When this happens, access redirection logic 24 no longer acts between CPU 21 and peripheral device 25 and a direct access path is established between CPU 21 and peripheral device 25. Access redirection logic 24 only receives the results from CPU 21 once the peripheral operation of peripheral device 25 is complete. FIG. 3 illustrates various signal paths among CPU 21, access redirection logic 24, and peripheral device 25, which will be described in more detail below.

Referring to FIG. 3, CPU 21 generates the APPLN_REQ signal to access redirection logic 24 via line 31. Peripheral device 25 generates the PERI_REQ signal to access redirection logic 24 via line 32. Access redirection logic 24 generates the HOST_IRQ signal to CPU 21 via line 33. Access redirection logic 24 generates the TASK_COMPL_INT signal to CPU 21 via line 35. CPU 21 asserts the APPLN_REQ signal when the application software running on CPU 21 generates the application request for peripheral device 25 to perform the peripheral operation. Peripheral device 25 asserts the PERI_REQ signal to access redirection logic 24 when peripheral device 25 generates the peripheral request for controlling peripheral device 25 to perform the peripheral operation.

Access redirection logic 24 asserts the HOST_IRQ signal when either the APPLN_REQ signal or the PERI_REQ signal is asserted. The HOST_IRQ signal, when asserted, causes CPU 21 to be interrupted. Therefore, the HOST_IRQ signal represents the CPU interrupt request generated by access redirection logic 24 to CPU 21. CPU 21, when interrupted to execute the peripheral routine, accesses peripheral device 25 via direct access path 34 that includes bus 26 and system bus 28. CPU 21 deasserts the HOST_IRQ signal during execution of the interrupt routine.

When CPU 21 completes its execution of the peripheral routine, CPU 21 sends the results to access redirection logic 24 via direct access path 34. As described above, CPU 21 does this by updating various control registers, status registers, and data registers of logic 24. Access redirection logic 24 then sends the results to the application software running on CPU 21 that requires the results. Access redirection logic 24 does this by first asserting the TASK_COMPL_INT signal to CPU 21. This causes CPU 21 to be interrupted to receive the results.

For one embodiment, access redirection logic 24 is implemented by an application specific integrated circuit ("ASIC"). For this embodiment, all the functions of access redirection logic 24 are programmed into the ASIC by known programming means. Alternatively, access redirection logic 24 can be implemented by storing a set of program instructions into a ROM, an EPROM, or a flash EPROM. In addition, access redirection logic 24 can be implemented by a combination of logic circuits, for example, programmable logic devices ("PLDs"). The process that access redirection logic 24 executes for redirecting access requests to CPU 21 will be described in more detail below, in conjunction with FIG. 4. FIG. 5 illustrates the state diagram of access redirection logic 24, which will also be described in more detail below.

Figure 4:
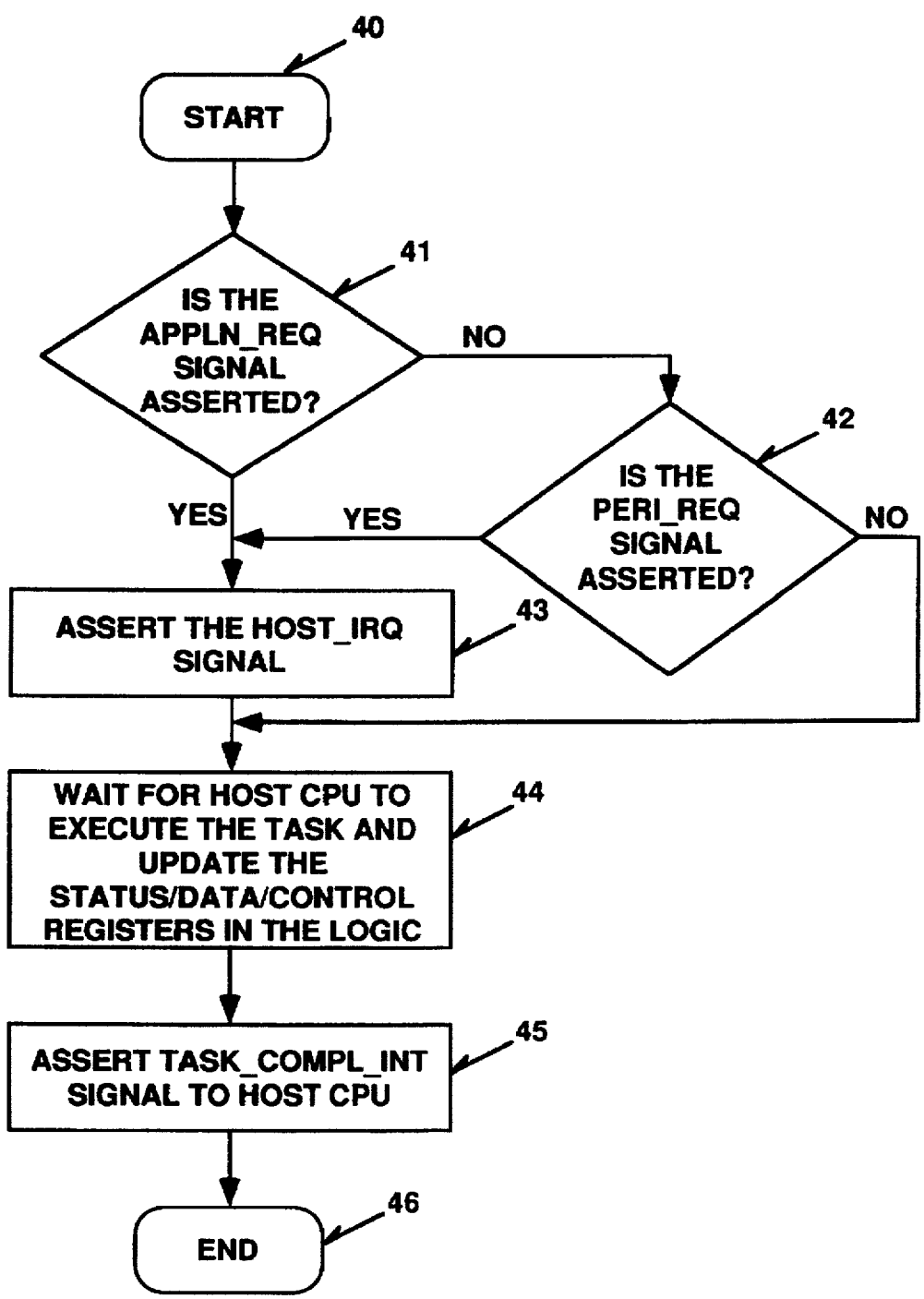
FIG. 4 is a flow chart diagram of the process executed by the access redirection logic of FIGS. 2-3.
Figure 5:
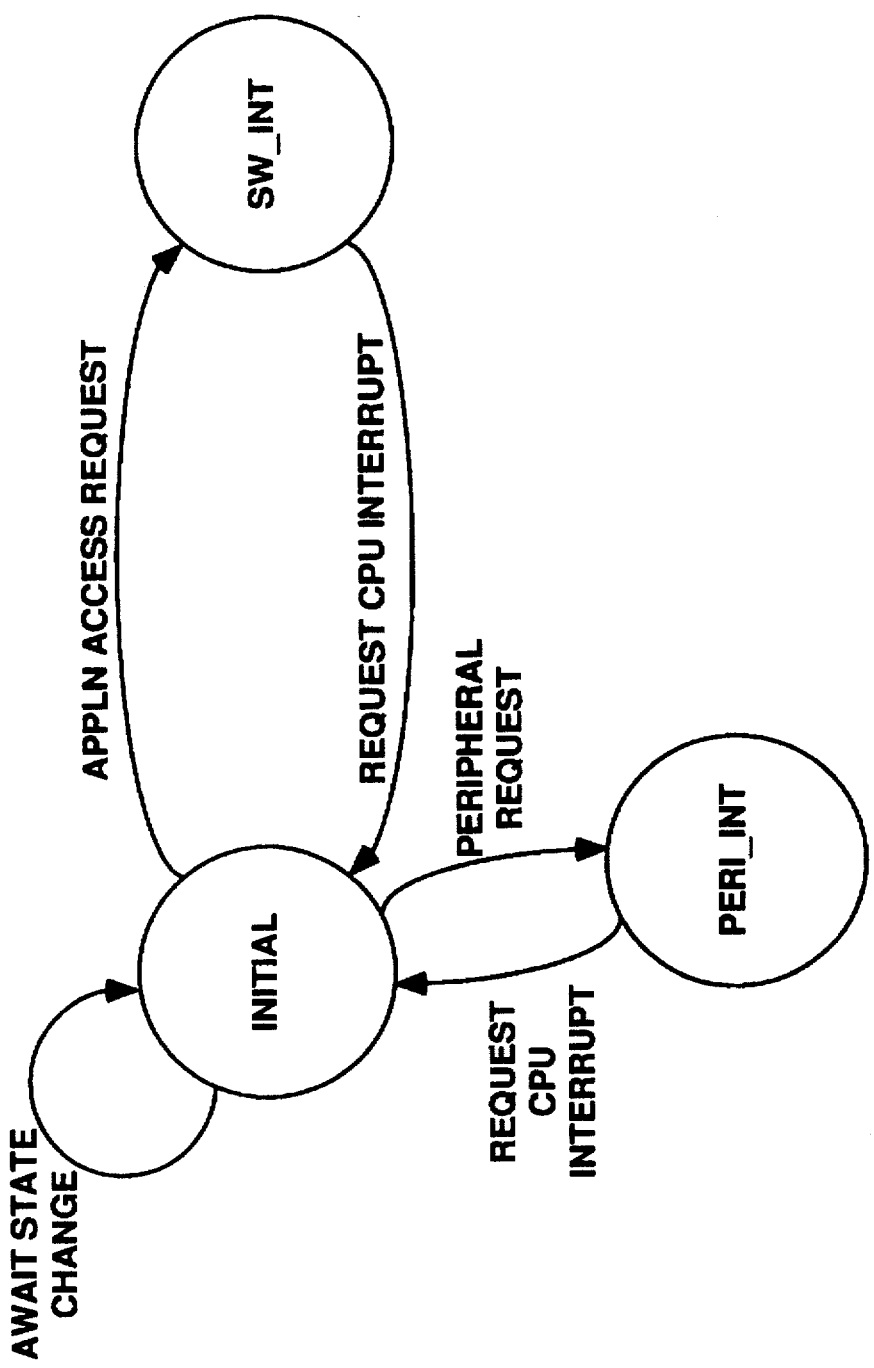
FIG. 5 a state diagram of the access redirection logic of FIGS. 2-3.

Referring to FIG. 4, the process of access redirection logic 24 starts at step 40. At step 41, a judgment is made to determine if the APPLN_REQ signal is asserted. If the answer is yes, then step 43 is performed. If the answer is no, then step 42 is performed. At step 42, another judgment is made to determine if the PERI_REQ signal is asserted. If the answer is yes, then step 43 is performed. If the answer is no, then the process goes to step 44.

At step 43, the HOST_IRQ signal is asserted to CPU 21. The asserted HOST_IRQ signal causes CPU 21 to be interrupted to perform the peripheral task. After asserting the HOST_IRQ signal, the process then goes to step 44. The deassertion of the HOST_IRQ signal is done by CPU 21 in the conventional manner.

At step 44, CPU 21 updates the control, status, and data registers of access redirection logic 24 with results of the task once CPU 21 completes its task. At step 45, the TASK_COMPL_INT signal is asserted to CPU 21 to send the results to the application software. The process then ends at step 46.

The TASK_COMPL_INT signal and the HOST_IRQ signal can be one interrupt request signal from logic 24 to CPU 21. In this case, the peripheral routine in CPU 21 will include logic that distinguishes the two functions.

As described above, access redirection logic 24 can be implemented by logic circuits. When this is the case, the process of FIG. 4 can be implemented in hardware fashion by a combination of known logic gate circuits.

Access redirection logic 24 can be implemented by software emulation in host CPU 21.

Referring to FIG. 5, the state diagram of access redirection logic 24 is shown. FIG. 5 shows an "INITIAL" state, a "SW_INT" state, and a "PERI_INT" state. In the "INITIAL" state, logic 24 waits for CPU 21 to assert the APPLN_REQ signal or peripheral device 25 to assert the PERI_REQ signal. When logic 24 detects that the APPLN_REQ signal is generated, logic 24 moves to the "SW_INT" state where logic 24 asserts the HOST_IRQ signal to interrupt CPU 21. Logic 24 then returns to the "INITIAL" state.

When logic 24 detects that the PERI_REQ signal is asserted in the "INITIAL" state, logic 24 moves to the "PERI_INT" state where logic 24 asserts the HOST_IRQ signal to interrupt CPU 21. Logic 24 then returns to the "INITIAL" state.

In the foregoing specification, the invention has been described with reference to specific embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer system including a bus and a CPU connected thereto, said system comprising:

at least one peripheral device without a dedicated microcontroller, said peripheral device coupled to said bus for performing peripheral operations of the computer system;

system memory connected to said bus for storing peripheral device routines for performing said peripheral operations, an operating system and applications software, said operating system and said applications software being peripheral controller-oriented;

access redirection logic coupled to said bus and to said peripheral device and having logic for receiving requests for peripheral device operation from said peripheral controller-oriented applications software executed by said CPU and upon receipt thereof generating a CPU interrupt request signal to said CPU that causes said CPU to execute said peripheral device routines, memory storing results of said execution of said peripheral device routines, and logic for supplying the contents of said memory to said CPU.

2. The system of claim 1 wherein said memory storing said results of said peripheral device routines comprises registers for storing control, status and data required to operate said peripheral device.

3. The system of claim 1 wherein said logic for supplying the contents of said memory to said CPU comprises logic for sending a task complete interrupt request to said CPU upon completion of said peripheral device routine.

4. The system of claim 1 wherein said coupling of said access redirection logic to said bus and to said peripheral device comprises:

means for supplying an application request from said CPU to said access redirection logic;

means for supplying an interrupt request from said access redirection logic to CPU;

means for supplying a task complete interrupt from said access redirection logic to said CPU; and means for supplying a peripheral request from said peripheral device to said access redirection logic.

5. The system of claim 1 wherein said access redirection logic is an application specific integrated circuit.

6. An improved computer system including a bus and a CPU connected thereto, at least one peripheral device without a dedicated microcontroller coupled to said bus for performing peripheral operations of the computer system, system memory connected to said bus storing peripheral device routines for performing said peripheral operations, an operating system and applications software, said operating system and said applications software being peripheral controller-oriented, said improvement comprising:

receiving means coupled to said bus and to said peripheral device for receiving a request for peripheral device operations;

means coupled to said CPU and responsive to said receiving means for generating a CPU interrupt request signal that causes said CPU to call said peripheral device routines upon the receipt of said a request for peripheral device operations, storage means coupled to said bus and communicating with said CPU for storing results of said peripheral device routines, and means coupled to said bus for supplying the contents of said storage means to said CPU.

7. The system of claim 6 wherein said request is generated by said controller-oriented applications software.

8. The system of claim 6 wherein said request is generated by said peripheral device.

9. The system of claim 6 wherein said means for storing said results of said peripheral device routines comprises registers for storing control, status and data required to operate said peripheral device.

10. The system of claim 6 wherein said means coupled to said bus for supplying the contents of said memory to said CPU comprises logic for sending a task complete interrupt request to said CPU upon completion of said peripheral device routine.

11. A method for controlling a peripheral device in a computer system which includes a bus and a CPU connected to said bus, a peripheral device without a dedicated microcontroller coupled to said bus for performing predefined peripheral operations of the computer system, a system memory coupled to said bus storing a peripheral controller-oriented operating system, a peripheral controller-oriented applications program, and peripheral device routines, and access redirection logic coupled to said bus and to said peripheral device and having registers that contain control, status and data required to operate said peripheral device, said method comprising the following steps:

receiving a request for peripheral operation;

upon receipt of said request, generating an interrupt to said CPU that causes said CPU to execute said peripheral device routines;

storing the results in said control, status and data registers in said access redirection logic; and supplying said stored results to said CPU.

12. The method of claim 11 wherein said step of supplying said stored results to said CPU includes generating a task complete interrupt to said CPU.

* * * * *